(12) United States Patent
Porikli et al.

(10) Patent No.: US 9,262,808 B2
(45) Date of Patent: Feb. 16, 2016

(54) DENOISING OF IMAGES WITH NONSTATIONARY NOISE

(71) Applicant: Mitsubishi Electric Research Laboratories, Inc., Cambridge, MA (US)

(72) Inventors: Fatih Porikli, Watertown, MA (US); Akshay Soni, Cambridge, MA (US)

(73) Assignee: MITSUBISHI ELECTRIC RESEARCH LABORATORIES, INC., Cambridge, MA (US)

( * ) Notice: Subject to any disclaimer, the term of this patent is extended or adjusted under 35 U.S.C. 154(b) by 166 days.

(21) Appl. No.: 13/762,022

(22) Filed: Feb. 7, 2013

(65) Prior Publication Data

US 2014/0219552 A1 Aug. 7, 2014

(51) Int. Cl.
G06K 9/62 (2006.01)
G06T 5/00 (2006.01)
G06T 5/20 (2006.01)

(52) U.S. Cl.
CPC . *G06T 5/002* (2013.01); *G06T 5/20* (2013.01); *G06K 9/62* (2013.01); *G06T 2207/20012* (2013.01); *G06T 2207/20021* (2013.01); *G06T 2207/20076* (2013.01)

(58) Field of Classification Search
CPC ......... G06K 9/40; G06K 9/32; G06K 9/4642; G06T 5/10; G06T 7/408; G06T 7/402; G06T 3/4015; G06T 2211/421; G06T 2207/20061; H04N 19/00066; H04N 19/0089; H04N 19/00078; H04N 19/00296; H04L 1/04; H04L 5/0021; G01J 2003/2826; G01L 21/0208; H03G 9/025
USPC .......... 382/155, 248, 266, 275; 345/204, 505, 345/506, 582, 589
See application file for complete search history.

(56) References Cited

U.S. PATENT DOCUMENTS

| | | | | | |
|---|---|---|---|---|---|
| 4,918,633 | A * | 4/1990 | Sullivan | ............... | G06K 9/40 375/245 |
| 5,329,309 | A * | 7/1994 | Dorricott | ............. | H04N 19/615 348/446 |
| 5,410,644 | A * | 4/1995 | Thier | .................. | G06T 3/005 345/501 |
| 5,466,918 | A * | 11/1995 | Ray | ....................... | G06T 9/008 235/380 |
| 5,675,550 | A * | 10/1997 | Ekhaus | ............... | G01S 13/9035 342/179 |
| 7,003,037 | B1 * | 2/2006 | Bordes | ................... | H04N 19/63 375/240.16 |
| 7,130,484 | B2 * | 10/2006 | August | ................ | G06T 15/003 348/533 |
| 7,245,783 | B2 * | 7/2007 | Fielding | ................ | G06T 7/408 345/632 |
| 7,286,712 | B2 * | 10/2007 | Lee | ...................... | G06K 9/4652 382/248 |

(Continued)

OTHER PUBLICATIONS

K. Dabov, A. Foi, V. Katkovnik, and K. Egiazarian, "Image denoising by sparse 3D transform-domain collaborative filtering," IEEE Transactions on Image Processing, vol. 16, No. 8, Aug. 2007.

(Continued)

*Primary Examiner* — Vu Le
*Assistant Examiner* — Aklilu Woldemariam
(74) *Attorney, Agent, or Firm* — Dirk Brinkman; Gene Vinokur

(57) ABSTRACT

An input image is denoised by first constructing a pixel-wise noise variance map from the input image. The noise has spatially varying variances. The input image is partitioned into patches using the noise variance map. An intermediate image is determined from the patches. Collaborative filtering is applied to each patch in the intermediate image using the noise variance map to produce filtered patches. Then, the filtered patches are projected to an output image.

19 Claims, 1 Drawing Sheet

(56) References Cited

U.S. PATENT DOCUMENTS

| | | | | |
|---|---|---|---|---|
| 7,430,257 B1* | 9/2008 | Shattil | ............. | H04B 1/707 342/367 |
| 8,111,889 B2* | 2/2012 | Basu | ............. | G06T 11/005 382/130 |
| 2003/0156762 A1* | 8/2003 | August | ............. | G06K 9/40 382/260 |
| 2005/0117775 A1* | 6/2005 | Wendt | ............. | G06T 1/005 382/100 |
| 2005/0226484 A1* | 10/2005 | Basu | ............. | G06T 11/005 382/131 |
| 2007/0248163 A1* | 10/2007 | Zuo | ............. | H04N 19/176 375/240.2 |
| 2008/0285796 A1* | 11/2008 | Wendt | ............. | G06T 1/0064 382/100 |
| 2011/0075935 A1* | 3/2011 | Baqai | ............. | G06T 7/0002 382/195 |
| 2011/0222597 A1* | 9/2011 | Xu | ............. | H04N 19/70 375/240.01 |
| 2014/0153819 A1* | 6/2014 | Lin | ............. | G06T 5/002 382/159 |

OTHER PUBLICATIONS

X. Pan, X. Zhang, and S. Lyu, "Exposing image splicing with inconsistent local noise variances," in IEEE International Conference on Computational Photography, 2012.

* cited by examiner

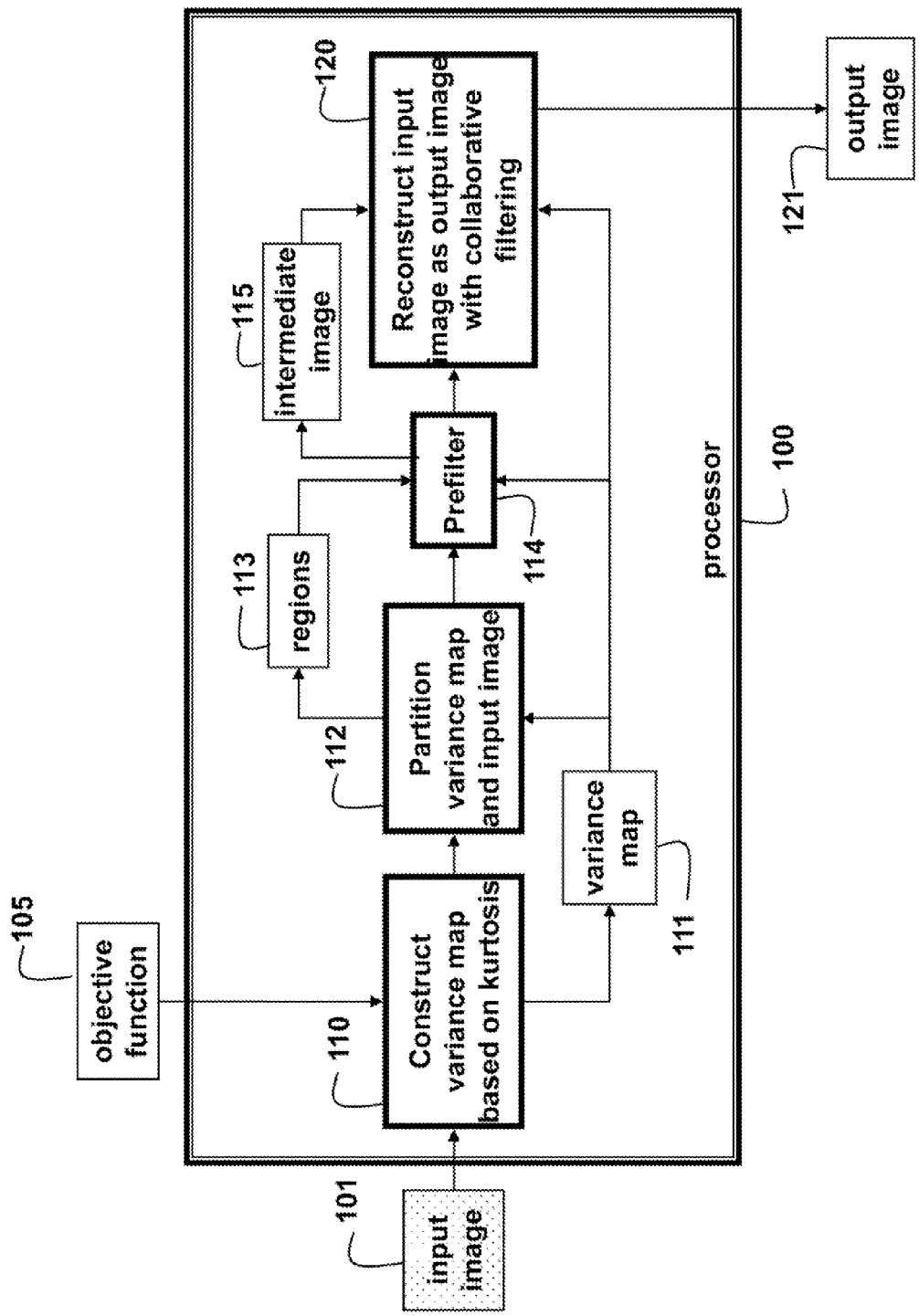

DENOISING OF IMAGES WITH NONSTATIONARY NOISE

FIELD OF THE INVENTION

This invention relates generally to image processing, and more particularly to denoising images.

BACKGROUND OF THE INVENTION

Images are typically denoised using noise models, or according to images classes. All those methods are based on certain assumptions about the noise model, or the image signal to remove noise. One of the most widely used assumptions is the sparsity of the signal in a transform domain.

An image is sparse in the transform domain when most magnitudes of transform domain coefficients are either zero, or negligible. In that case, the image can be well approximated as a linear combination of a small number of bases that correspond to pixel-wise consistent patterns. Denoised image can be obtained by keeping only transform coefficients larger than a first threshold, which are mainly due to the original signal, and discarding coefficients smaller than a second threshold, which are mainly due to noise.

The sparsity level of an image in the transform domain heavily depends on both the signal and the noise properties. The selection of a good sparsity inducing transform is an art, and is effectively a function of the underlying, signal to be denoised, and the noise. For example, multi-resolution transforms achieve good sparsity for spatially localized details, such as edges and singularities. Because most images are typically full of such details, transform domain methods have been successfully applied for image denoising.

Conventional transform representations using, e.g., a discrete cosine transform (DCT) or wavelets, are advantageous for their computational simplicity, and provide a sparse representation for signals that are smooth, or have localized singularities, respectively. Therefore, conventional orthogonal transforms can provide sparse representation only for a particular class of signals. For all other classes of signals, it is now known that representations learned for a specific class yields sparser representations. Over-completeness provides extra degree of freedom to represent the original signal, and further increase, the sparsity in transform domain.

Dictionary learning provides a way to learn sparse representations for a given class of signals. Non-local means (NLM) de-noising is based on non-local averaging, of all the pixels in an image. The amount of weighting for a pixel is based on a similarity of a small patch of pixels, and another patch of pixels centered on the pixel being de-noised.

In terms of a peak signal-to-noise ratio, PSNR, block matching in 3D (BM3D) approaches optimal results for constant variance noise, but cannot be improved beyond 0.1 dB values, BM3D is a two-step process. The first step gives an early version of the denoised image by processing stacks of image blocks constructed by block matching. The second stage applies a statistical filter in a similar manner. For a reference block, pixel-wise similar blocks are searched and arranged in a 3D stack. Then, an orthogonal transform is applied to the stack, and the noise is reduced by thresholding the transform coefficients, followed by an inverse transform. Sparsity is enhanced due to similarity between the 2D blocks in the 3D stack. After an estimate of the denoised image is obtained, the second step finds the locations of the blocks similar to the processed block, and forms two groups, one from the noisy image and other from the estimate. Then, the orthogonal transform is applied again to both the groups and Wiener filtering is applied, on the noisy group using an energy spectrum of the estimate as the true energy spectrum.

Most methods for dictionary learning, and almost all methods for denoising including the non-local means and the BM3D, assume that the signal is corrupted by stationary noise. This is valid for most conventional imaging methods. However, for range, depth, radar, and synthetic aperture radar (SAR), this assumption is invalid. For example, when measuring depth directly with light-based range scanners, noise varies locally due to different reflection of scanner light pulses near transparent or reflective surfaces, or near boundaries. Similarly, the variance of speckle noise in radar imaging due to random fluctuations from an object that is smaller than a single pixel varies significantly from pixel to pixel.

U.S. patent application Ser. No. 13/330,795, "Image Filtering by Sparse Reconstruction on Affinity Net," filed by Assignee, describes a method for reducing multiplicative and additive noise in image pixels by clustering similar patches of the pixels into clusters. The clusters form nodes in an affinity net of nodes and vertices. From each cluster, a dictionary is learned by a sparse combination of corresponding atoms in the dictionaries. The patches are aggregated collaboratively using the dictionaries to construct a denoised image.

SUMMARY OF THE INVENTION

Most conventional methods for denoising natural images assume that the images are corrupted by stationary Gaussian noise, or a similar probability distribution, function (pdf) with a constant variance. However, for other acquisition technologies, such as range, laser, and radar imaging, the constant variance noise assumption is invalid.

Therefore the embodiments of the invention provide a method for denoising an image that is corrupted by noise of a spatially varying variance, nonstationary noise. To denoise such an image, the first step is to estimate the noise variance, potentially at every pixel, and then to denoise the image using the estimated variance information.

The method uses a two-step procedure. The first step construct a variance map of the nonstationary noise by solving an optimization problem that is based on a scale invariant property of kurtosis, a measure of the peakedness of the probability distribution of the random noise. The second step reconstructs the input image as the output image, patch by patch, using the variance map and collaborative filtering.

As an advantage, the method performs much better, up to +5 dB, than the state-of-the-art procedures both in the terms of PSNR and a mean structure similarity (MSSIM) index.

BRIEF DESCRIPTION OF THE DRAWINGS

FIG. 1 is a now diagram of a method for denoising an image according to embodiments of the invention.

DETAILED DESCRIPTION OF THE PREFERRED EMBODIMENTS

General Denoising Method

FIG. 1 shows a method for denoising an input image 101 that is corrupted by noise of a spatially varying variance, i.e., nonstationary noise. A variance map 111 of the nonstationary noise is constructed 110 from the input image by solving an optimization problem with an objective function 105 that is based on a scale invariant property of kurtosis, a measure of the peakedness of the probability distribution of the noise. The input image is partitioned 112 into regions 113 that contain overlapping patches. The variance map is similarly partitioned such that there is a one-to-one correspondence between the patches.

A prefilter process 114 is applied to construct an intermediate image 115. Then, the input image 101 is reconstructed 120 as the output image 121, patch by patch, using the variance map 111, the intermediate image 115 and collaborative filtering to produce the denoised output image.

The method can be performed in a processor 100 connected to memory and input output interlaces as known in the art. It should be noted that our method is autonomous because the only input is the noisy image.

Noise Model

The embodiments of our invention for denoising images uses the following noise model $$I''(i,j) = I(i,j) + \eta(i,j), \quad (1)$$

where $I(i,j)$ is the intensity of an image pixel p at location (i,j), and $\eta(i,j)$ is the noise with a variance $\sigma^2(i,j)$.

We do not assume that the noise variance is constant, as in most conventional noise models. Instead, the noise according to our model is spatially varying. In other words, we do not make constant Gaussian assumptions about the noise. In fact, the noise distribution function can vary significantly within large regions. For sufficiently small local image patches, we use $\eta(i,j): N(0,\sigma^2(i,j))$.

Our Multiple Image-Noise Denoising (MIND) method can handle the case where the input image is corrupted by multiple noises of varying variances. The MIND method can be applied to color images by denoising each color (e.g., red, green, blue) channel independently.

We estimate variances of the noise at all pixel locations to construct the variance map by taking advantage of a statistical regularity of natural images. That is, the kurtosis values of natural images in general band-pass filtered domains tend to be close to a positive constant because natural images tend to have spherically symmetric distributions.

We use the objective function to estimate the global variance of the noise in the entire image by imposing kurtosis across different scales, i.e., different band-pass filtered channels of discrete cosine transform (DCT) or wavelets, to be a positive constant. For local variances at each pixel location, we use statistics of a small patch of neighboring pixels. Other transforms, such as 2D transform is selected from the group consisting of a discrete Fourier transform, principal component analysis (PCA), independent component analysis (ICA, subspace mappings, and combinations thereof can also be used.

We denoise the patches of the input image by taking into consideration the estimated local noise variance. We determine multiple clusters of similar patches, and filter the clusters arranged into 3D data structure.

Our method outperforms the state-of-the-art BM3D and NLM, in terms of PSNR and MSSIM. In comparison to the conventional BM3D with global noise variance estimator, MIND consistently provides +2 dB to +5 dB additional gain, while preventing patchy artifacts of under and over filtered patches.

MIND Method

Kurtosis Based Variance Map Estimation

Constructing an accurate variance map from the single noisy image is an important step for successfully removing noise with a spatially changing variance. In the prior art, kurtosis based noise variance estimation procedure is typically used for entirely different applications, such as image splicing and forgery detection.

For a random variable x, kurtosis is defined as $$\kappa = \bar{\mu}_4 (\sigma^2)^{-2} - 3, \quad (2)$$

where the variance is $\sigma^2 = E_x[(x-E_x[x])^2]$, the uncentered $4^{th}$ order moment is $\bar{\mu}_4 = E_x[(x-E_x[x])^4]$, and E is the expected value function. According to this definition, a Gaussian variable has a zero kurtosis. An important property, which is essentially the base of our method, is that for natural images the kurtosis is nearly constant over band-pass filtered domains such as DCT, or wavelet decompositions.

We first summarize how we can estimate the variance when the noise is stationary, and then extend the estimation to nonstationary and locally varying noise.

Global Noise Variance Estimation

For the signal model as in equation, the (1), the noisy input image I'' is first transformed to frequency domain. For a band-pass filtered domain of K channels, i.e., the response of the image convolved with K different band-pass filters. The kurtosis of an original (noiseless) image and the noisy image in the $k^{th}$ channel are $\kappa_k$ and $\bar{\kappa}_k$, respectively.

Assuming an independence of white Gaussian noise in the input image, and the additivity of fourth order cumulants and using $\bar{\sigma}_k^2$ for the variance of the $k^{th}$ channel, the statistics are related as $$\bar{\kappa}_k = \kappa_k \left( \frac{\sigma_k^2 - \sigma^2}{\sigma_k^2} \right)^2. \quad (3)$$

The statistical regularity of natural images in the band-pass filtered domains tend to have positive kurtosis values, and are sometimes termed super Gaussian. We can take the square-root on the both sides of equation (3), to improve the accuracy of the denoised image.

For near constant kurtosis values over different scales, we have $\kappa_k \approx \kappa$ (k=1, ..., K). Then, the task is to estimate $\kappa$ and $\sigma^2$, which minimizes a difference between the two sides of equation (3) after taking square-root over all scales. This can be written as an optimization problem using an objective function $$\min_{\sqrt{\kappa}, \sigma^2} \sum_{k=1}^{K} \left[ \sqrt{\bar{\kappa}_k} - \sqrt{\kappa} \left( \frac{\sigma_k^2 - \sigma^2}{\sigma_k^2} \right) \right]^2, \quad (4)$$

where the minimizing (min) provides the solution for the variance of the noise. The minimization of equation (4) is possible due its convexity, and the optimal solution has a closed form.

Local Noise Variance Estimation

Our goal is to the estimate noise variance $\sigma^2(i,j)$ at each pixel location using the closed form solution of equation (4), with statistics collected from all surrounding pixels from a rectangular patch of pixels. The variance and kurtosis, using uncentered moments $\mu_l = E_x[x^l]$, are $$\sigma^2 = \mu_2 - \mu_1^2, \text{ and} \quad (5)$$

$$\kappa = \frac{\mu_4 - 4\mu_3\mu_1 + 6\mu_2\mu_1^2 - 3\mu_1^4}{\mu_2^2 - 2\mu_2\mu_1^2 + \mu_1^4}.$$

A direct approach would estimate the variance and kurtosis for each band of each overlapping image patch of size D×D using equation (5), where raw moments are estimated using spatial averaging, and then apply the closed form solution of equation (4) to estimate the local noise variance. However, the direct approach is computationally complex. Therefore, we convert the image to an integral image, which makes the moment estimation task a matter of a small number of additions and subtractions.

Variance Map Based Denoising

After we have constructed the variance map using the kurtosis-based approach, the next step denoises the noisy input image. We begin by partitioning the input image 101 into regions 113 using the variance map and the input image. For each region we extract overlapping patches of size P×P from the noisy image, determine an intermediate image 115 using a prefilter 114, and perform collaborative filtering on each patch. Specifically, for every noisy patch $I_p^n \in \Re^{P \times P}$, $p=1, \ldots, N$, where N is the total number of p patches, we assume that the patch is corrupted by Gaussian noise with a variance $\sigma_p^2$. This assumption is valid because the image noise varies from patch to patch, rather than from pixel to pixel. Furthermore, the patches are sufficiently small to model noise with a single Gaussian distribution, e.g., 12×12 to 32×32.

Because we estimate the noise variance at every pixel, the single noise variance $\sigma_p^2$ of the $p^{th}$ patch is a weighted mean of the estimated noise variance at every pixel of that patch. Alternatively, the noise variance is a maximum of all pixels.

After we have the single noise variance $\sigma_p^2$ for every patch, we apply the following steps for each current patch $I_p^n$ of overlapping indices p.

Prefilter

For each current patch $I_{p*}^n$, we locate the most similar patches $I_q^n$ in its neighborhood within the region to which the neighborhood belongs, and determine clusters $S_p^\phi$. Note that the clusters can include a different number of patches.

The clusters obtained far the patches of the noisy image might be quite different than a noiseless version of the image. Therefore, we apply transform domain filtering before determining the clusters. This preprocessing significantly improves the performance. Because we have already determined the local variances, we use the normalized cross-correlation (ncc) in the transform domain as the measure of similarity of patches p and q $$ncc(I_p^n, I_q^n) = \frac{[\phi(f_{2D}(I_p^n - \mu_p))][\phi(f_{2D}(I_q^n - \mu_q))]}{\sigma_p \sigma_q},$$

where $\phi$ is a hard-thresholding operator with a threshold of $\lambda_{2D}\sigma_p$, and $f_{2D}$ $f_{2D}$ is DCT. Scaling is done with the spatial domain variance because we are interested in relative scores. The result of this step produces a set $S_p^\phi$, which contains the coordinates of the patches that are similar to $I_p^n$. We arrange these patches into a 3D structure $I_p(S_p^\phi)$ on which a 1D transform and hard-thresholding is applied a second time along the patch index, to the values of the pixels at the same patch locations, followed by the inverse 1D transform $$\hat{I}_p(S_p^\phi) = f_{1D}^{-1}(\phi(f_{1D}(I_p(S_p^\phi)))),\quad (6)$$

where $\phi$ is the hard-thresholding operator with a threshold $\lambda_{1D}\sigma_p$. The intuition behind this second transform domain hard-thresholding along each pixel is to incorporate support from multiple patches to suppress intensity divergences.

A prefiltered, intermediate image $I^m$ is obtained by mapping back $\hat{I}_p(S_p^\phi)$ onto the image coordinates and combining the pixel-wise responses, i.e., on a pixel-by-pixel basis, using the weighted mean, where the weights are defined by the local variances $$\omega_p = \begin{cases} (\sigma_p^2 N_\phi(p))^{-1} & \text{if } N_\phi(p) \geq 1 \\ 1 & \text{otherwise,} \end{cases} \quad (7)$$

where $N_\phi(p)$ is the number of the coefficients retained after the hard-thresholding.

Collaborative Filtering

In this step, we revise the clusters of patches $S_p^w$, this time from the intermediate image $I^m$ from the previous step, by applying a Wiener filter (w) to the clusters.

We arrange the intermediate patches $I_p^m$ and current patches $I_p^n$ into $I_p(S_p^w)$ and $I_p(S_p^w)$, respectively. We use $I_p(S_p^w)$ to more accurately determine the Wiener deconvolution coefficients and apply these coefficients to clusters formed from the unfiltered noisy patches $I_p(S_p^w)$, so that we have the correct clustering of patches, and an undistorted noise distribution. Recall, when the noise is small, the Wiener filter is simply the inverse of the noise impulse function. However, as the noise at certain frequencies increases, the Wiener filter attenuates frequencies dependent, on the SNR.

The Wiener deconvolution coefficients in the discrete Fourier transform (DFT) domain are defined from the energy of the transform domain coefficients as $$W(S_p^w) = \frac{|f_{3D}(I(S_p^w))|^2}{|f_{3D}(I(S_p^w))|^2 + \sigma_p^2}, \quad (8)$$

where $f_{3D}$ is the DFT. Here, we also use the previously determined local variances. The element-by-element multiplication in equation (8) with the trans form domain coefficients $f_{3D}(I_p(S_p^w))$ produces the Wiener filtered response in the transform domain, which is then mapped back to the spatial domain by $$\hat{I}_p(S_p^w) = f_{3D}^{-1}(W(S_p^w)f_{3D}(I(S_p^w))) \quad (9)$$

to obtain the filtered, patches $\hat{I}_p(S_p^w)$. Then, we project the filtered patches to the output image $I^f$ to aggregate the multiple estimates for each pixel location with weights inversely proportional to the Wiener coefficients and variance values $$\omega_p^w(p) = (\sigma_p^2 \|W(S_p^w)\|_2^2)^{-1}, \quad (10)$$

so pixels with a larger uncertainty contribute less.

In another embodiment, a sparse coding by dictionary learning is used instead of the Wiener filtering for collaborative filtering. For each 3D data cluster $I_p(S_p^w)$, an undercomplete dictionary is learned from using an alternative decision process applied to the affinity net. The patches in the same cluster are coded by a sparse combination of corresponding dictionary atoms. The reconstructed patches are collaboratively aggregated to construct a denoised image, see U.S. application Ser. No. 13/330,795 filed by Assignee.

Multiplicative Noise

Our MIND can be applied to multiplicative noise that is common in radar and laser imaging by operating in a log-intensity domain to transform the multiplicative denoising into additive denoising. During the collaborative filtering, clusters can be any size, and can be represented by corresponding unique dictionaries that are designed to best represent the coherent variations at the same pixel locations in the cluster data.

We belief that our denoising is possibly the best method for removing spatially varying Gaussian noise. The method can achieve up to +5 dB better performance than the conventional BM3D method.

The method takes advantage of kurtosis based local variance estimation and collaborative filtering. It should be noted that the method does not require training, with only input being the noisy image.

Results indicate that that MIND significantly outperforms prior art methods in terms of PSNR and MSSIM.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

We claim:

1. A method for denoising an input image of pixels including noise, comprising the steps of:
    constructing a noise variance map from the input image, wherein the noise has spatially varying variances, and the noise variance map is pixel-wise;
    partitioning the input image and the variance map into regions using the noise variance map, wherein each region contains overlapping patches;
    determining an intermediate image from the patches;
    applying collaborative filtering to each patch in the intermediate image using the noise variance map to produce filtered patches;
    projecting the filtered patches to a denoised output image;
    applying a two-dimensional (2D) frequency transformation to each patch to obtain a transform domain patch;
    setting frequency coefficients larger than a first threshold of the transform domain patch to zero to obtain a hard-thresholded transform domain patch;
    determining a normalized cross-correlation between the hard-thresholded transform domain patches using the noise variance map;
    determining a set of similar patches using the normalized cross-correlations;
    arranging similar patches into a three-dimensional (3D) data structure, and applying a one-dimensional (1D) transformation to each row of the 3D data structure, wherein a row corresponds to a pixel location around a center pixel of the patch, to obtain a second 3D data structure;
    setting frequency coefficients larger than a first threshold of the second 3D data to zero to obtain a second hard-thresholded 3D data; and
applying an inverse 1D transform to the second hard-thresholded 3D data to obtain the filtered patches, and the projecting uses a weighted mean for each patch, wherein the steps are performed in a processor.

2. The method of claim 1, wherein the constructing further comprises:
    solving an optimization problem with an objective function based on a measure of peakedness of a probability distribution of the noise to obtain the noise variance map.

3. The method of claim 2, wherein the measure of peakedness is kurtosis.

4. The method of claim 3, wherein the kurtosis is equal to a fourth order moment around a mean divided by a square of a variance of a probability distribution minus three:

$$\kappa = \bar{\mu}_4(\sigma^2)^{-2} - 3,$$

where the variance is $\sigma^2 = E_x[(x-E_x[x])^2]$, the uncentered $4^{th}$ order moment is $\bar{\mu}_4 = E_x[(x-E_x[x])^4]$, and E is an expected value function.

5. The method of claim 1, wherein a model of the noise is $$I'(i,j) = I(i,j) + \eta(i,j),$$

where I(i,j) is an intensity of the pixel p at a location (i,j) in the input image, and $\eta(i,j)$ is the noise with a variance $\sigma^2(i,j)$.

6. The method of claim 1, wherein the noise variance map is constructed for every pixel in the input image.

7. The method of claim 1, wherein the pixels in any one patch have similar noise variances.

8. The method of claim 1, further comprising:
    applying transform domain filtering to the patches of the same region, and a measure of similarity of the patches is a normalized cross-correlation in a transform domain.

9. The method of claim 1, further comprising:
    determining a normalized cross-correlation between the intermediate image patches using the pixel-wise noise variance map;
    determining a set of similar patch locations using the normalized cross-correlations;
    constructing a three-dimensional (3D) data from the patches using a set of similar patch locations; and
    applying the collaborative filtering to 3D data to obtain the output image.

10. The method of claim 9, wherein the collaborative filtering uses a Weiner filter.

11. The method of claim 9, wherein the collaborative filtering uses a sparse coding by dictionary learning.

12. The method of claim 9, wherein the collaborative filtering uses the variance of each patch.

13. The method of claim 12, wherein the variance of each patch is a weighted mean of the noise variance at every pixel in the patch.

14. The method of claim 12, wherein the variance of the noise is a maximal variance of all of the pixels in the patch.

15. The method of claim 2, wherein the input image is converted to an integral image.

16. The method of claim 15, further comprising:
    decomposing the input image into a set of frequency subband images;
    determining a set of uncentered moments for each patch of the frequency subband images using the integral image and spatial averaging; and
    estimating a local variance around each pixel as the noise variance map value at that pixel.

17. The method of claim 1, wherein the input image is a color image, and each color channel is denoised independently.

18. The method of claim 1, wherein the noise is multiplicative noise, and further comprising:
    transforming the input image to a log-intensity domain.

19. The method of claim 1, wherein the 2D transform is selected from the group consisting of a discrete Fourier transform, a wavelet transform, principal component analysis, independent component analysis, subspace mappings, and combinations thereof.

* * * * *